(12) United States Patent
Kim et al.

(10) Patent No.: US 7,047,362 B2
(45) Date of Patent: May 16, 2006

(54) CACHE SYSTEM AND METHOD FOR CONTROLLING THE CACHE SYSTEM COMPRISING DIRECT-MAPPED CACHE AND FULLY-ASSOCIATIVE BUFFER

(75) Inventors: Shin-Dug Kim, Goyang (KR); Jung-Hoon Lee, Seoul (KR)

(73) Assignee: Samsung Electronics, Co. LTD, Kyungki-Do (KR)

( * ) Notice: Subject to any disclaimer, the term of this patent is extended or adjusted under 35 U.S.C. 154(b) by 198 days.

(21) Appl. No.: 10/258,074

(22) PCT Filed: May 16, 2001

(86) PCT No.: PCT/KR01/00793

§ 371 (c)(1),
(2), (4) Date: Jan. 31, 2003

(87) PCT Pub. No.: WO01/88716

PCT Pub. Date: Nov. 22, 2001

(65) Prior Publication Data

US 2003/0149842 A1    Aug. 7, 2003

(30) Foreign Application Priority Data

May 16, 2000 (KR) .................... 2000-26187

(51) Int. Cl.
*G06F 12/00* (2006.01)

(52) U.S. Cl. ...................... 711/128
(58) Field of Classification Search ........... 711/133, 711/137, 122, 143
See application file for complete search history.

(56) References Cited

U.S. PATENT DOCUMENTS 6,397,296 B1 * 5/2002 Werner .................. 711/122
6,460,115 B1 * 10/2002 Kahle et al. ............ 711/122
6,609,177 B1 * 8/2003 Schlumberger et al. .... 711/122

* cited by examiner

*Primary Examiner*—Kevin L. Ellis
*Assistant Examiner*—Duc T Doan
(74) *Attorney, Agent, or Firm*—F. Chau & Associates, LLC (57) ABSTRACT

A method is provided for controlling a cache system. The cache system to be controlled comprises a direct-mapped cache configured with a small block size, and a fully associative spatial buffer configured with a large block, which includes a plurality of small blocks. Where accesses to the direct-mapped cache and the fully associative buffer are misses, data of a missed address and data of adjacent addresses are copied to the large block in the fully associative spatial buffer according to a first-in-first-out (FIFO) process. Furthermore, if one or more small data blocks is accessed among its corresponding large block of data which is to be expelled from the fully associative buffer, the small block(s) accessed is copied to the direct-mapped cache.

12 Claims, 6 Drawing Sheets

CACHE SYSTEM AND METHOD FOR CONTROLLING THE CACHE SYSTEM COMPRISING DIRECT-MAPPED CACHE AND FULLY-ASSOCIATIVE BUFFER

FIELD OF THE INVENTION

The present invention relates to a method for controlling a cache system to improve an access speed of a central processing unit (CPU), and more particularly, to a method for controlling a cache system having a direct-mapped cache and a fully associative buffer.

BACKGROUND

Figure 1:
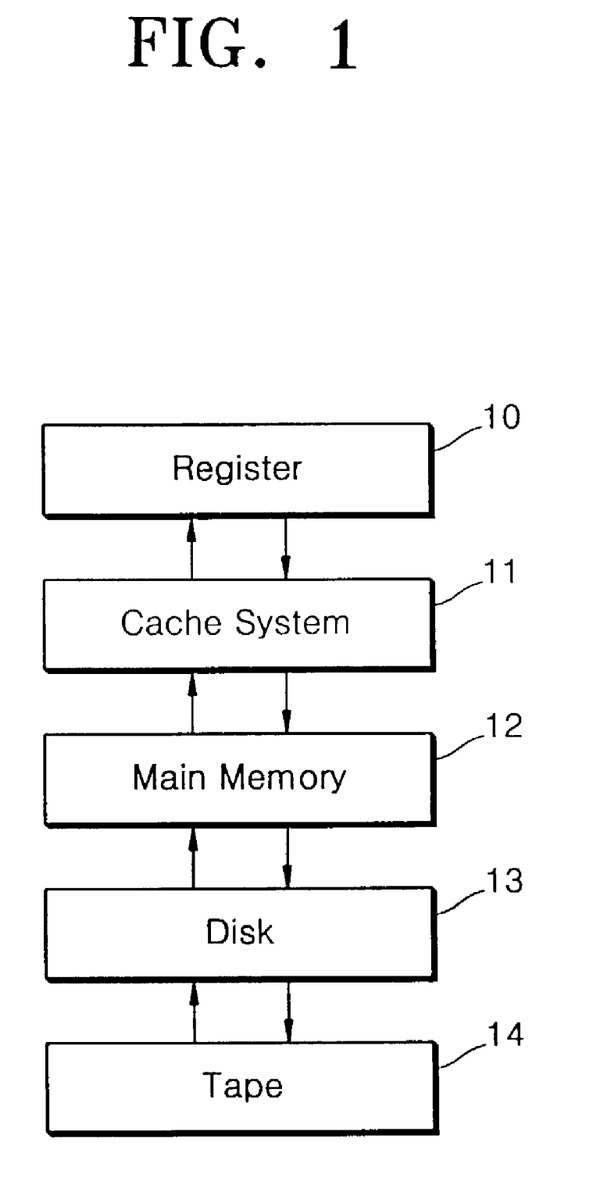
FIG. 1 is a block diagram of a memory hierarchy arranged according to the order in which a central processing unit (CPU) accesses different memories in the hierarchy.

In present day multilevel and complex memory systems, access time to a memory upon the request by a CPU for instructions or data can engender considerable delays. A memory hierarchy is needed which is arranged according to the order in which the CPU accesses data from different memories in the hierarchy, as shown in FIG. 1. Referring to FIG. 1, the CPU accesses memories in the order of a register 10, a cache system 11, a main memory 12, a disk 13, and a tape 14. Here, the register 10 having the fastest access time is referred to as the highest hierarchical level and the tape 14 having the slowest access time is referred to as the lowest hierarchical level.

Among the above memories, the cache system 11 is accessed prior to the main memory 12, and therefore the structure and controlling method of the cache system may significantly impact the execution speed and power consumption of a CPU. The cache system 11 is designed and controlled based on the principle of locality.

The locality is categorized into spatial locality and temporal locality. The spatial locality refers to the tendency for adjacent or nearby memory locations to be referenced close together in time. The temporal locality is the likelihood that data retrieved once will be retrieved again soon.

Cache systems exploit the temporal locality by retaining recently referenced data, and the spatial locality by fetching multiple words as a cache block whenever a miss occurs. These two approaches for optimizing each type of locality contradict each other when cache capacity is fixed. Typically, the increment in the block size is inversely proportional to the number of cache blocks. For this reason, as the size of a block increases, more data adjacent to the accessed memory address are copied in the cache system. In this case, referenced data resides a shorter amount of time in the cache system because of the reduced number of cache blocks. Thus, if the storage capacity of the cache system is fixed at a predetermined level, as the size of a block increases, the cache system has a higher spatial locality but a lower temporal locality. Conversely, as the size of a block decreases, the cache system has a lower spatial locality but a higher temporal locality.

To reduce the above conflicts as much as possible, a cache system has been proposed to include two cache memories, which are separately controlled. According to a conventional cache control method of the cache system, complex mechanisms were used to exploit two localities, e.g., methods of using locality prediction table, compiler, locality detection unit, prefetching, and so forth. These conventional cache control methods have problems in that they are complex in design and have high hardware cost.

SUMMARY OF THE INVENTION

The present invention is directed to a cache system that includes two caches with different configurations and its control method to exploit temporal locality and spatial locality, resulting in reduced miss ratio and power consumption.

According to an embodiment of the present invention, a method is provided for controlling a cache system having a direct-mapped cache configured with a small block size and a fully associative spatial buffer configured with a large block size.

The method comprises the steps of: (a) copying data of an accessed address and data of adjacent addresses to the large block in the fully associative buffer according to a first-in-first-out (FIFO) process if accesses to the direct-mapped cache and the fully associative spatial buffer are misses; (b) and moving corresponding small block(s) accessed to the direct-mapped cache if one or more small blocks is accessed among the large block of data which is to be expelled from the fully associative spatial buffer in the step (a).

According to another embodiment of the present invention, a method is provided for controlling a cache system having a direct-mapped cache configured with a small block size and a fully associative spatial buffer configured with a large block including a plurality of small blocks.

The method for controlling a cache system having a direct-mapped cache and a fully associative spatial buffer comprises the steps of: (a) checking whether an empty large block exists in the fully associative buffer if accesses to the direct-mapped cache and the fully associative buffer are misses; (b) if the empty large block exists in the step (a), copying data of an address accessed in the step (a) and data of adjacent addresses in the large block to the fully associative buffer according to a FIFO process.

Where no empty block exists in the step (a), the method further comprises performing following steps (c1)–(c7); (c1) checking whether a small data block, which has been written directly to the fully associative spatial buffer, exists among its corresponding large data block to be expelled according to a first-in-first-out (FIFO) process; (c2) if the small data block which has been written directly to the fully associative spatial buffer exists belonging to its large data block to be expelled, moving the corresponding small data block into the direct-mapped cache; (c3) checking whether the small block of data that has been accessed exists among the large block of data to be expelled according to a FIFO process; (c4) if the small block of data accessed exists, checking whether the small block of data to be expelled has been written directly to the direct-mapped cache; (c5) if the small block of data to be expelled has been written directly to the direct-mapped cache or to the fully associative buffer, moving the small block of data to be expelled into the main memory; (c6) moving the small block of data confirmed to have been accessed in the step (c3) to the direct-mapped cache; and (c7) copying data of an address accessed in the step (a) and data of adjacent addresses in the large block to the fully associative buffer according to a FIFO process.

According to another embodiment of the present invention, there is provided a cache system comprising a direct-mapped cache and a fully associative spatial buffer, the direct-mapped cache being configured with a small block size, the fully associative spatial buffer being configured with a large block size having a plurality of small blocks of small block size, wherein data of accessed addresses and data of adjacent addresses are copied to the large block in the fully associative buffer according to a first-in-first-out (FIFO) process if accesses to the direct-mapped cache and the fully associative spatial buffer are misses; and one or more small blocks accessed among the large block of data which is to be expelled from the fully associative spatial buffer are moved into the direct-mapped cache.

Temporal locality is exploited by selectively caching candidate data of small blocks into the direct-mapped cache. Spatial locality is enhanced using a large fetch size. Selection mechanism for temporal locality is based on a time interval for choosing the blocks to store into the direct-mapped cache. Instead of placing every missed block directly into the direct-mapped cache, according to the present invention, a large block including the missed small block is placed into the fully associative spatial buffer. Then, the missed block is moved into the direct-mapped cache at the moment when the large block is replaced from the fully associative spatial buffer, according to a first-in-first-out (FIFO) process.

When a miss occurs in both the direct-mapped and the fully associative spatial buffer, data of missed addresses and nearby addresses is fetched into a large block of the spatial buffer. If a reference misses in the direct-mapped cache, but hits in the spatial buffer, its corresponding small block is fetched from the spatial buffer and its hit bit is set. Using this hit bit enables the cache system to selectively determine those blocks showing temporal locality. Thus, data may reside in the direct-mapped cache for a long period, and therefore the temporal locality is raised, which results in reducing miss rates and power consumption.

DETAILED DESCRIPTION OF PREFERRED EMBODIMENTS

Figure 2:
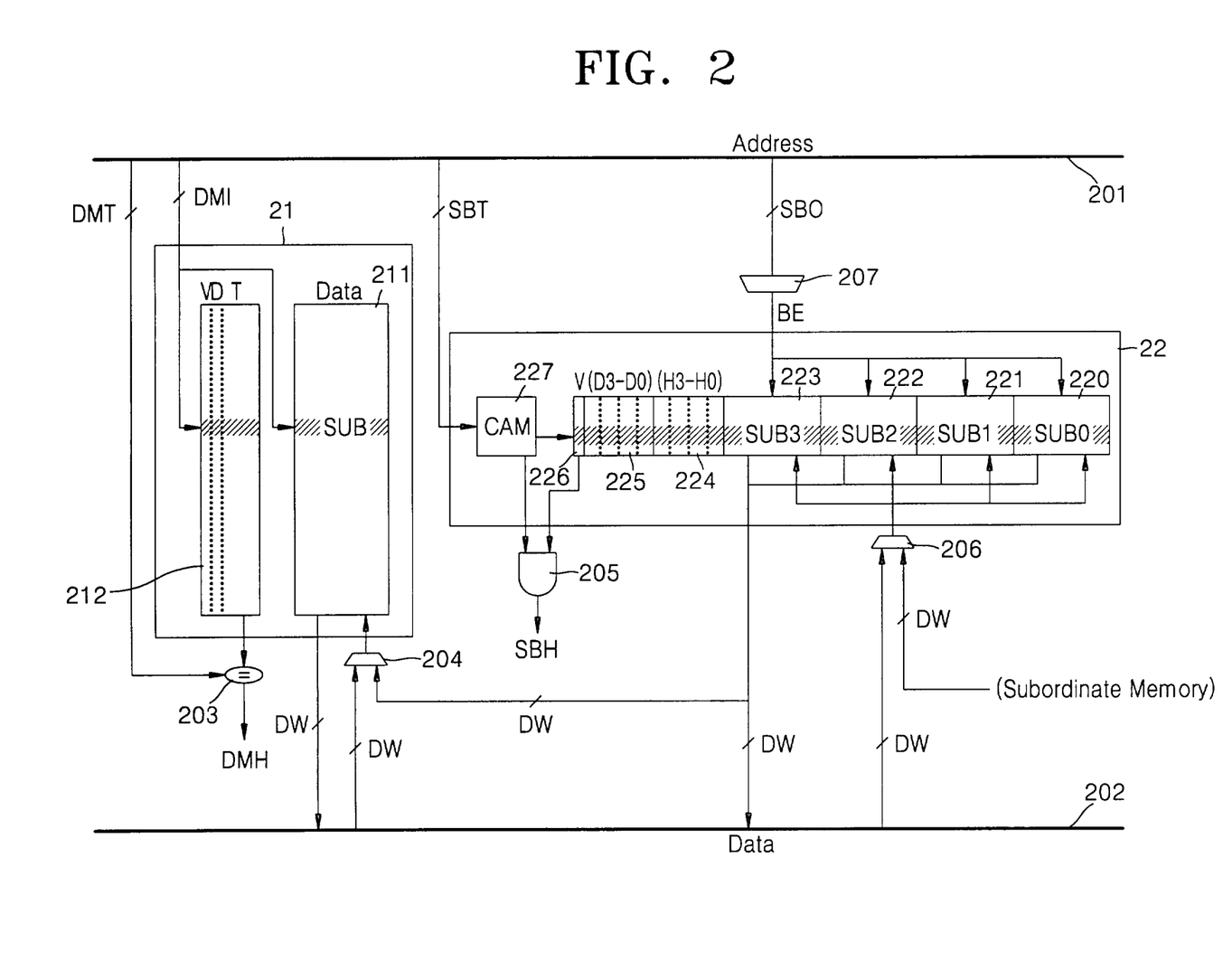
FIG. 2 is a block diagram illustrating a cache system to which a cache control method is applied according to an embodiment of the present invention.

According to an embodiment of the present invention, a cache system, to which a cache control method is applied, includes a direct-mapped cache 21 and a fully associative spatial buffer 22, as shown in FIG. 2. The direct-mapped cache 21 includes a data storage unit 211 and a control bit storage unit 212. The data storage unit 211 is configured such that data accessed by a central processing unit (CPU, not shown) are stored in an 8-byte small block (SUB). The control bit storage unit 212 stores a group of bits, i.e., a 1-bit valid bit (V), a 1-bit dirty bit (D), and an n-bit tag bit (T), for each small block (SUB) in response to an index signal DMI input through an address bus 201. A comparator 203 checks to see if a value of a tag signal DMT input from the CPU through the address bus 201 exists in the tag bit (T) of the control bit storage unit 212, and generates an access result signal DMH indicative of whether access to the direct-mapped cache 21 is a hit or miss. The access result signal DMH is input to the CPU through a control bus (not shown). A multiplexer 204 selectively inputs to the data storage unit 211 of the direct-mapped cache 21 one data word (DW) among 8 bytes of data words (DWs) from a data bus 202 and 8 bytes of data words (DWs) from four small blocks 220, 221, 222, and 223 of the fully associative spatial buffer 22.

The fully associative spatial buffer 22 is configured such that data of an address accessed by the CPU and data of adjacent addresses are stored in a 32-byte large block having the four small blocks 220, 221, 222, and 223. A content addressable memory (CAM) 227 in the fully associative spatial buffer 22 generates a valid bit (V) 226 for the large block 220, 221, 222, and 223 and a dirty bit (D) 225 and a hit bit (H) 224 for each of the small blocks 220, 221, 222, and 223 in response to a tag signal SBT input from the CPU through the address bus 201. An AND gate 205 checks whether an address generated in the content addressable memory 227 is valid and generates an access result signal SBH indicative of whether access to the fully associative spatial buffer 22 is a hit or a miss. The access result signal SBH is input to the CPU through the control bus.

Two-bit offset control signal SBO from the address bus 201 selectively enables inputs and outputs of the small blocks 220, 221, 222, and 223 by issuing each bank enable signal BE through a multiplexer 207. Furthermore, 8 bytes of data words (DWs) from the data bus 202 or from a subordinate memory such as a main memory are input to the selectively enabled small blocks 220, 221, 222, and 223 through a multiplexer 206.

Figure 3:
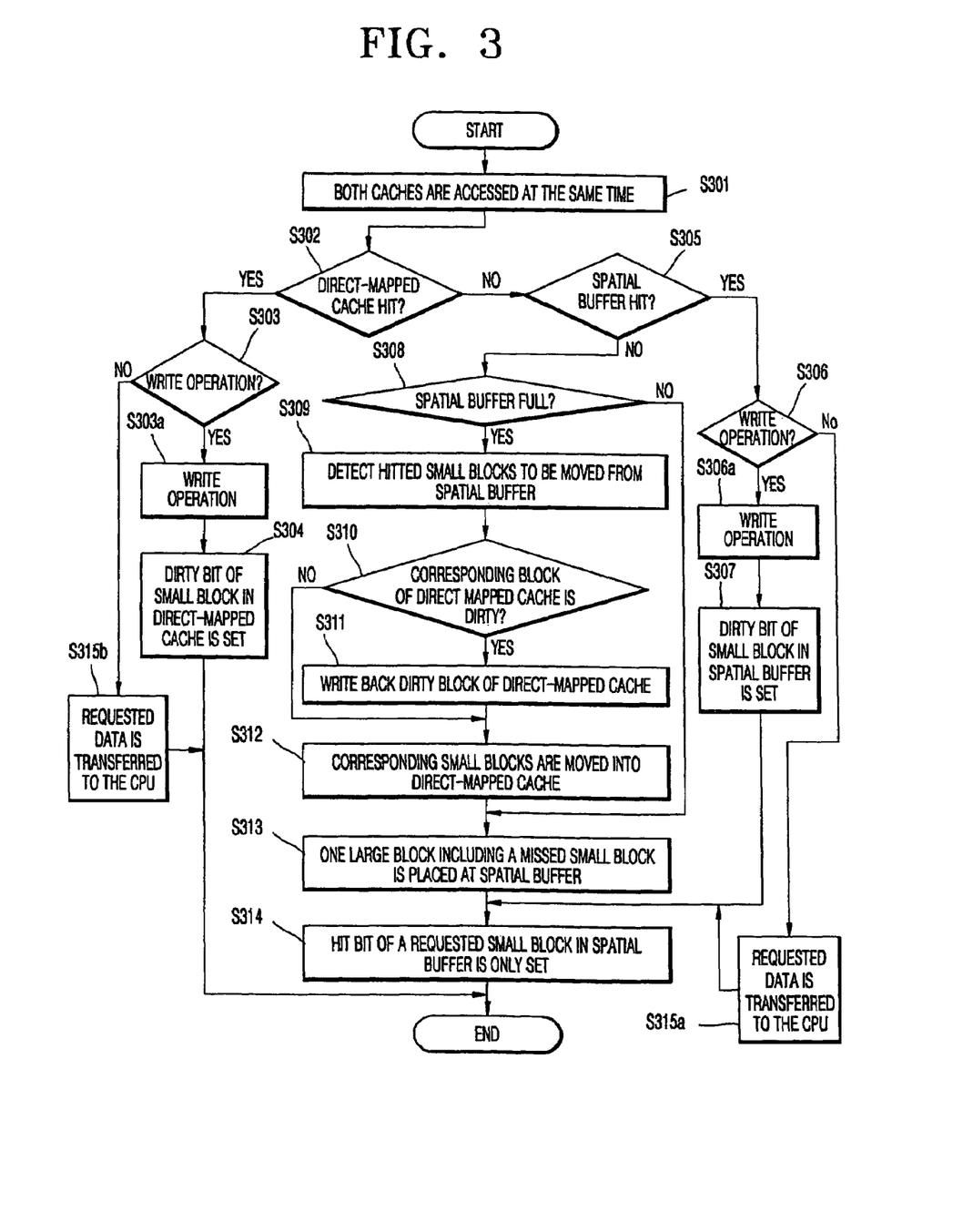
FIG. 3 is a flowchart for controlling the cache system of FIG. 2.

A method for controlling the cache system according to the present invention will now be described with reference to FIGS. 2 and 3.

First, the direct-mapped cache 21 and the fully associative spatial buffer 22 are accessed in parallel at the same level by read or write operation upon a write or read request from the CPU (step S301). Then, it is checked whether an access to the direct-mapped cache 21 is a hit (step S302). If a read access to the direct-mapped cache 21 is a hit (step S303), read data are transmitted to the CPU (step S315) to terminate the process. If a write access to the direct-mapped cache 21 is a hit (step S303), the write operation is performed (step S303a), and a dirty bit (D) for the small block (SUB) accessed in the direct-mapped cache 21 is set (step S304) to terminate the process.

On the other hand, when an access to the direct-mapped cache 21 is a miss, it is checked whether an access to the fully associative spatial buffer 22 is a hit (step S305) at the same time. If a read access to the fully associative spatial buffer 22 is a hit (step S306), a hit bit H3, H2, H1 or H0 for each small block 220, 221, 222 or 223 accessed is set (step S314) and the read data are transmitted to the CPU (step S315), thereby terminating the process. If a write access to the fully associative buffer 22 is a hit (step S306), the write operation is performed (Step S306a), and a dirty bit D3, D2, D1, or D0 and a hit bit H3, H2, H1 or H0 for each small block 220, 221, 222 or 223 accessed are set (steps S307 and S314), thereby terminating the process. A write back operation of any dirty small block 220, 221, 222, or 223 in the fully associative spatial buffer cannot directly occur at the fully associative spatial buffer because any modified or referenced small block 220, 221, 222, or 223 is always copied at the direct-mapped cache 21 before this block is replaced.

If accesses to both direct-mapped cache 21 and fully associative spatial buffer 22 are a miss, a check is made as to whether an empty large block 220, 221, 222, and 223 exists in the fully associative spatial buffer 22 (step S308). Here, if the states of all valid bits (V) 226 in the fully associative spatial buffer 22 are set, no empty large block 220, 221, 222, and 223 exists therein. If the state of one of the valid bits 226 is not set, an empty large block 220, 221, 222, and 223 exists in the fully associative spatial buffer 22.

If an empty large block 220, 221, 222, and 223 exists in the fully associative spatial buffer 22, a large data block is copied to the empty large block 220, 221, 222, and 223 in the fully associative spatial buffer 22 according to a first-in-first-out (FIFO) process (step S313). Then, a hit bit H3, H2, H1 or H0 for each small block 220, 221, 222 or 223 accessed is set (step S314). Here, in the case of a read operation, the read data are transmitted to the CPU.

On the other hand, if no empty large block 220, 221, 222, and 223 exists in the fully associative spatial buffer 22, a check is made as to whether there is a small block of data 220, 221, 222, or 223 accessed within the large block 220, 221, 222, and 223 of data, which is to be expelled from the fully associative spatial buffer 22 according to a FIFO process (step S309). In step S309, if at least one among the hit bits H3, H2, H1, and H0 of the small blocks 220, 221, 222, and 223 is set, it is determined that a corresponding small block of data has been accessed. Also a large block of data in the main memory is copied to an empty large block 220, 221, 222, and 223 in the fully associative spatial buffer 22 according to a FIFO process (step S313). Then, a hit bit H3, H2, H1, or H0 of the small block of data 220, 221, 222, or 223 accessed is set (step S314). Here, in the case of read operation, the read data are transmitted to the CPU (step S315).

If the small data block accessed exists in the step S309, it is checked whether the small block of data (SUB), which to be expelled from the direct-mapped cache, has been written directly to the direct-mapped cache 21 (step S310). In the step S310, if a dirty bit (D) of the corresponding small block (SUB) is set, the small block of data (SUB) is determined as written directly to the fully associative spatial buffer 22 or to the direct-mapped cache 21. (See the steps S307 and S304). If the small block of data (SUB) written according to the step S306a or S303a exists, the small block of data (SUB) is moved to a main memory that is a subordinate memory (step S311).

Furthermore, the small block of data 220, 221, 222, or 223 that has been accessed is copied into the direct-mapped cache 21 (step S312). Then, a large data block is copied to an empty large block 220, 221, 222 and 223 in the fully associative spatial buffer 22 according to a FIFO process (step S313). Then, a hit bit H3, H2, H1, or H0 of the small block of data 220, 221, 222, or 223 accessed is set while accessed (step S314). Here, in the case of a read operation, the read data is transmitted to the CPU (step S315).

Figure 4:
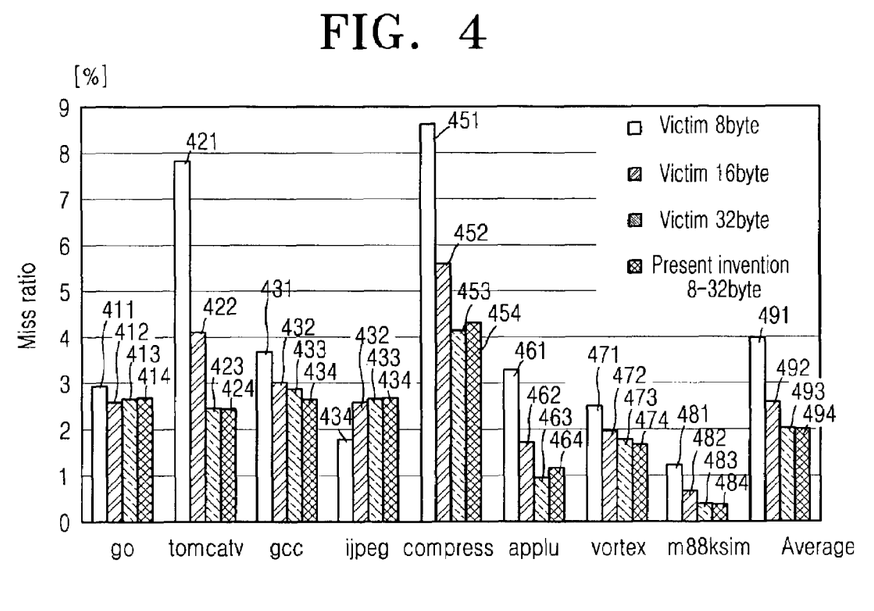
FIG. 4 is a graph showing miss ratios of a cache system according to a cache control method of the present invention in contrast with those of a victim cache system according to a conventional control method.
Figure 5:
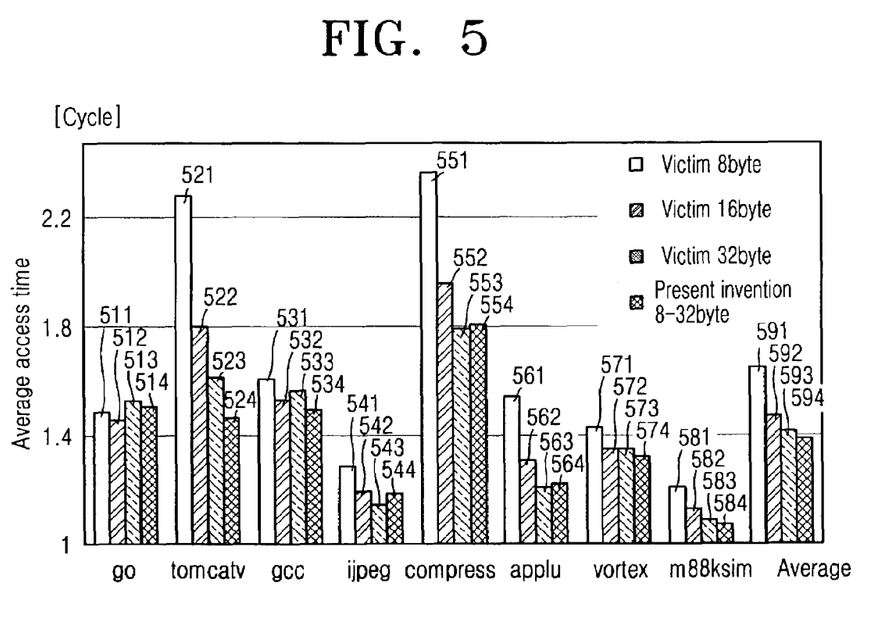
FIG. 5 is a graph showing average access times of a cache system according to a cache control method of the present invention in contrast with those of a victim cache system according to a conventional cache control method.
Figure 6:
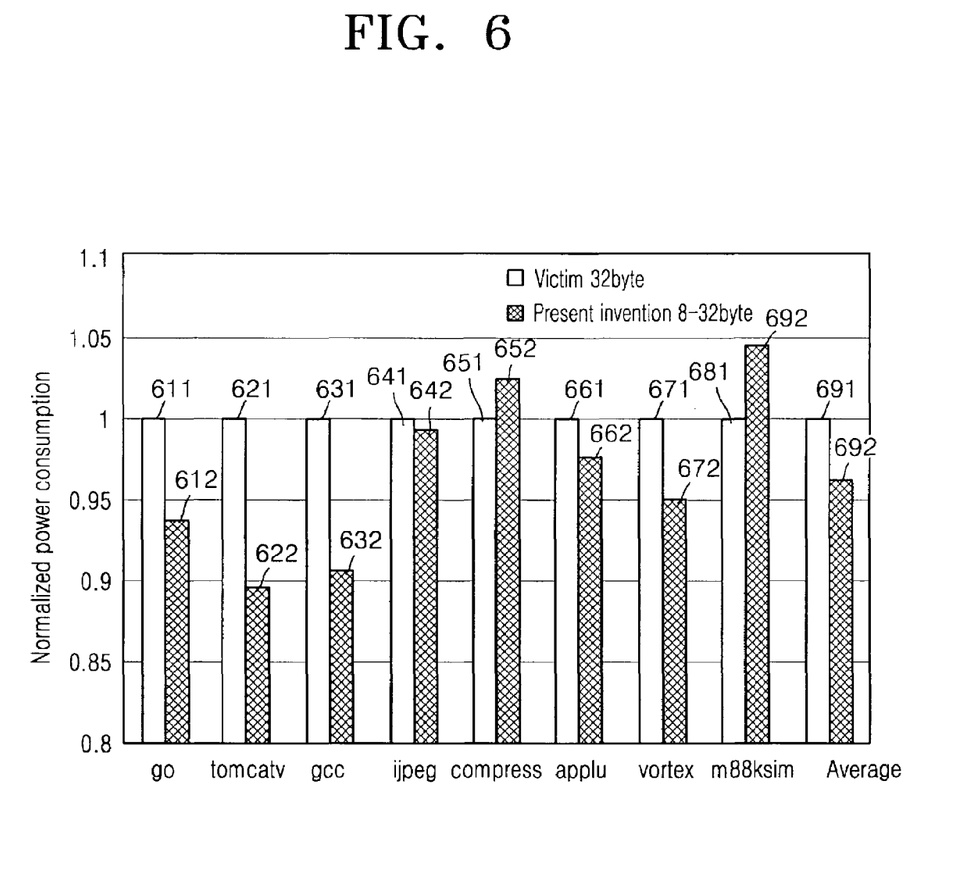
FIG. 6 is a graph showing normalized power consumption of a cache system according to a cache control method of the present invention in contrast with that of a victim cache system according to a conventional cache control method.

FIG. 4 shows miss ratios of a cache system according to a cache control method of the present invention in contrast with those of a victim cache system according to a conventional cache control method. FIG. 5 shows average access times of a cache system according to a cache control method of the present invention in contrast with those of a victim cache system according to a conventional cache control method. FIG. 6 shows normalized power consumption of a cache system according to a cache control method of the present invention in contrast with that of a victim cache system according to a conventional cache control method. Go, tomcatv, gcc, ijpeg, compress, applu, vortex, and m88ksim denote different benchmark programs having different temporal and spatial localities for simulations.

In a conventional victim cache system, a direct-mapped cache is configured the same as a victim buffer in terms of size of blocks. Reference numerals 411, 421, 431, 441, 451, 461, 471, 481, 491, 511, 521, 531, 541, 551, 561, 571, 581, and 591 denote graphs of a victim cache system including a direct-mapped cache and a victim buffer, each having 8-byte blocks. Reference numerals 412, 422, 432, 442, 452, 462, 472, 482, 492, 512, 522, 532, 542, 552, 562, 572, 582, and 592 denote graphs of a victim cache system including a direct-mapped cache and a victim buffer each having 16-byte blocks. The reference numerals 413, 423, 433, 443, 453, 463, 473, 483, 493, 513, 523, 533, 543, 553, 563, 573, 583, 593, 611, 621, 631, 641, 651, 661, 671, 681, and 691 denote graphs of a victim cache system including a direct-mapped cache and a victim buffer having 32-byte blocks. The reference numerals 414, 424, 434, 444, 454, 464, 474, 484, 494, 514, 524, 534, 544, 554, 564, 574, 584, 594, 612, 622, 632, 642, 652, 662, 672, 682, and 692 denote graphs of the cache system according to the present invention which comprises the direct-mapped cache 21 having 8-byte small blocks (SUB) and the fully associative spatial buffer 22 having the 32-byte large blocks 220, 221, 222, and 223, as shown in FIG. 2.

Referring to FIGS. 4, 5, and 6, the cache system, to which the cache control method is applied, has low miss ratio, low average access time, and low power consumption compared to conventional victim cache systems.

Figure 7:
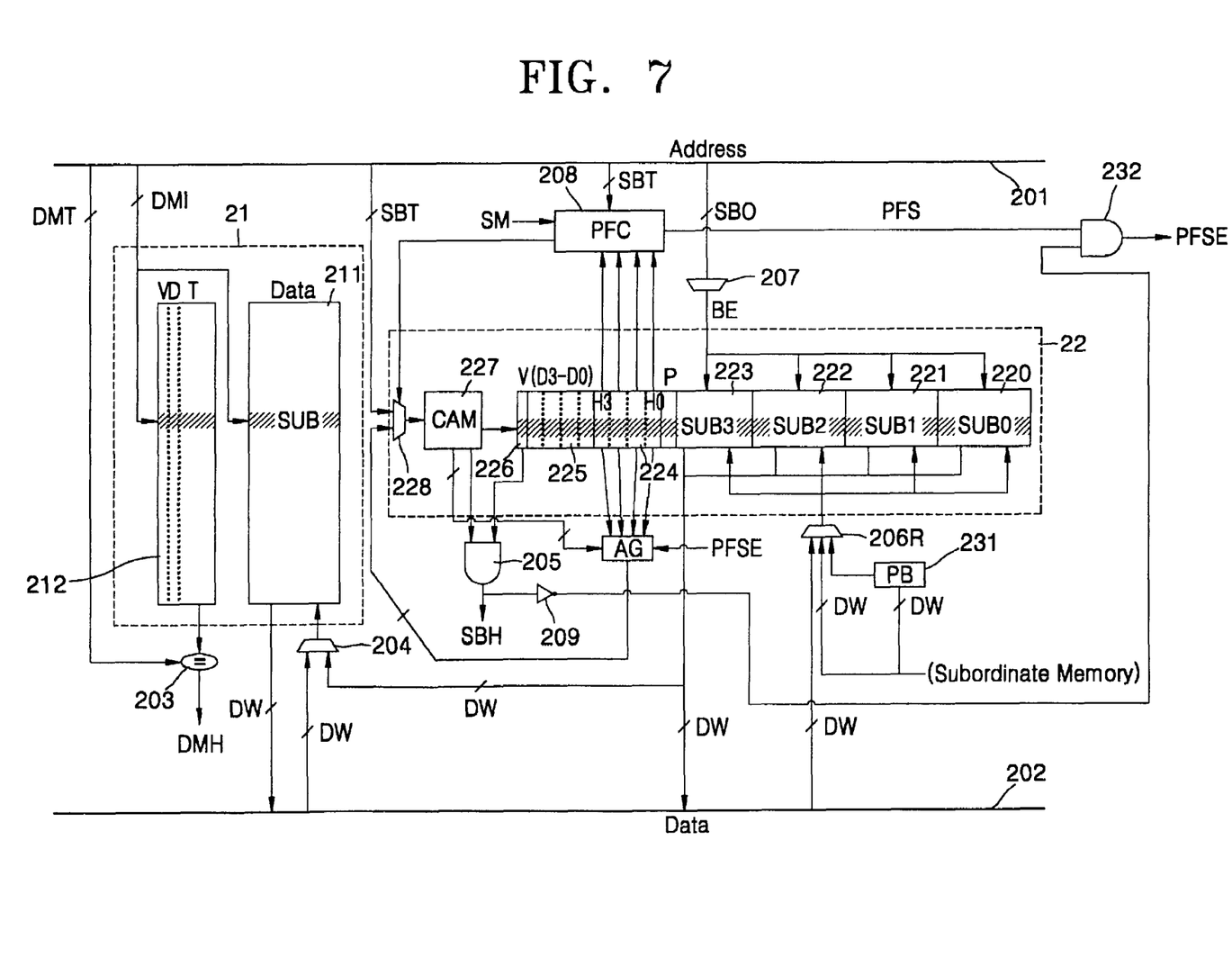
FIG. 7 is a block diagram illustrating a cache system to which a cache control method is applied according to another embodiment of the present invention.

FIG. 7 is a block diagram illustrating a cache system to which a cache control method is applied according to another embodiment of the present invention. Reference numerals of FIG. 7, which are the same as those of FIG. 2, indicate identical elements. The cache system comprises an address generator AG, a multiplexers 228 and 206R, an inverter 209, and an AND gate 232. The cache memory subsystem of FIG. 7 is similar to the system of FIG. 2 except having an additional feature for a pre-fetching mode, which will now be described.

In the case of the pre-fetching mode, if a pre-fetch bit (P) corresponding to the large block is still reset, a pre-fetch operation is initiated when a hit occurs in any bank of the fully associative spatial buffer 22, and at least one among the hit bits H3, H2, H1, and H0 corresponding to its large block SUB3, SUB2, SUB1 and SUB0 is already set. At the same time, the tags of the spatial buffer are searched for a pre-fetch address to check whether it is already present. If the address is not in the spatial buffer, the pre-fetch controller 208 generates a pre-fetch signal PFS and a target address PFA to fetch the large block into the pre-fetch buffer 231 from the subordinate memory. And also the pre-fetch bit (P) of the large block generating the pre-fetch signal is set. Preferably, this pre-fetch bit (P) is to prevent the pre-fetch controller 208 from searching the already used large block. That is, if the pre-fetch bit (P) of the large block is set, the sequential large block (i.e., pre-fetch target block) must be present in the fully associative spatial buffer 22 or the pre-fetch buffer 231. Therefore, there is no necessity for searching the tags of the fully associative spatial buffer 22 whether it is present.

Further, in the pre-fetching mode, the pre-fetch controller 208 generates a pre-fetch signal when multiple hit bits are set. Then two operations are performed consecutively by the pre-fetch controller 208. A first operation is to search the tag part of the fully associative spatial buffer 22 when a hit occurs for the l-th large block stored in the fully associative spatial buffer 22, in order to detect whether the (l+1)-th large block already exists in the fully associative spatial buffer 22. A one cycle penalty is present in this case, but this overhead is negligible because pre-fetching initiates only about 1.5%~2.5% of the total number of addresses generated by the CPU. Thus, an average MCPI (Memory Cycles Per Instruction) is increased by about 0.06%. If the (l+1)-th large block does not exist in the fully associative spatial buffer 22, a second operation is performed: the (l+1)-th large block is pre-fetched into the pre-fetch buffer 231. If misses occur at both the direct-mapped cache 21 and the fully associative spatial buffer 22, the cache controller initiates its miss handling process. While this miss handling occurs, a block that was already placed in the pre-fetch buffer 231 is transferred into the fully associative spatial buffer 22. Therefore, the transfer time can be totally hidden because there is plenty of time, e.g., 19 clock cycles for handling a miss, to perform this block move.

The cache system in FIG. 7 has two modes which can be user selectable, e.g., non-pre-fetching mode and a pre-fetching mode. The pre-fetching mode guarantees further performance gain with low overhead. On every memory access, both the direct-mapped cache 21 and the fully associative spatial buffer 22 are accessed at the same time.

In either non-pre-fetching mode or pre-fetching mode, if a small block (e.g., 8-byte block size) is found in the direct-mapped cache 21, the process is the same as any conventional cache hit. The requested data item is sent to the CPU without delay. In either non-pre-fetching mode or pre-fetching mode, when a memory address is generated by the CPU, some address bits are used to select one bank among several banks in the fully associative spatial buffer 22. If the size of a small block is 8-bytes and the size of a large block is 32-bytes as a design example, the number of banks is assumed to be four as in FIG. 7. Most two bits of large block offset are used to enable one of four banks in the fully associative spatial buffer 22. Thus, power consumption can be decreased by activating only one bank at a time. In this case, the block size of one bank is 8-bytes and it is equal to the size of a block in the direct-mapped cache 21. All of the small block entries in each bank hold a hit bit to check whether a particular small block within a large block has been referenced before or not. If a hit occurs in the fully associative spatial buffer 22, the hit bit of that small block becomes set to mark it as a referenced block.

In the case of pre-fetching mode, if the pre-fetch bit (P) corresponding to the large block is still reset, a pre-fetch operation is initiated when a hit occurs in any bank of the fully associative spatial buffer 22 and one or more of the hit bits corresponding to its large block is already set. At the same time, the tags of the fully associative spatial buffer 22 are searched for the pre-fetch address to check whether it is already present. If the address is not in the fully associative spatial buffer 22, the pre-fetch controller 208 generates the pre-fetch signal PFS to fetch the large block from the subordinate memory. And also, the pre-fetch bit (P) of the large block generating the pre-fetch signal is set. Here, when a small block SUB3, SUB2, SUB1, or SUB0 is accessed again within a large block SUB3, SUB2, SUB1, and SUB0 whose prefetch bit P is set, a prefetching is not performed because the corresponding prefetching has been already performed. The prefetching is performed within a step for updating the fully associative buffer 22(the steps S313 in FIG. 3). More particularly, during operation of the step S313 for updating the fully associative buffer 22, the data to be prefetched are copied into a large data block in the fully associative buffer 22 from the subordinate memory and via the prefetch buffer 231 and the multiplexer 206R. Here, the steps S308 through S313 in FIG. 3 are performed by the first-in-first-out (FIFO) process. And all hit bits of the pre-fetched block are set to zero.

Hereunder, a prefetch bit P is set and a prefetching is performed when a hit bit is finally set in a state that the other 3 hit bits of 4 hit bits H3, H2, H1, H0 of a large data block SUB3, SUB2, SUB1, and SUB0 has been set. Here, when a small data block SUB3, SUB2, SUB1, or SUB0 is accessed again within a large block SUB3, SUB2, SUB1, and SUB0 whose prefetch bit P is set, a prefetching is not performed because the corresponding prefetching has been already performed.

When an accessing is tried to the fully associative buffer 22, a current read address for searching in the content addressable memory 227 is instantly inputted to an address generator AG. If a hit bit is finally set in a state that the other 3 hit bits of 4 hit bits H3, H2, H1, H0 of a large data block SUB3, SUB2, SUB1, and SUB0 has been set, all logic states of the 4 hit bits H3, H2, H1, H0 are "1". In this case, the prefetch controller 208 inverts a state of a prefetch signal PFS which is inputted to an AND gate 232, so that the state of the prefetch signal PFS is "1". Also, an address generator AG inputs a next address of the input address from the content addressable memory 227, to a multiplexer 228. In other words, the address generator AG inputs a next address of the input address whose all hit bits are set as "1" to the multiplexer 228. Then, the content addressable memory 227 internally searches an address which is same as the input address from the multiplexer 228. Here, any address of a large data block whose prefetch bit P is set as "1" is not searched, so that the search time is reduced.

According to the search operation, one cycle delay is present, but this overhead is negligible because prefetching initiates only about 1.5%~2.5% of the total number of addresses generated by the CPU. In other words, the average MCPI (Memory Cycles Per Instruction) is increased by about 0.06%.

After the search operation, if the next address is present in the content addressable memory 227, the content addressable memory 227 inputs a signal of "1" state to the AND gate 205, so that an output signal from an inverter 209 and the AND gate 232 go to be "0" state. In other words, a fetch enable signal PFSE of "0" state is associative buffer 22 fro the subordinate memory and via the prefetch buffer 231 and the multiplexer 206R. Here, the steps S308 through S313 in FIG. 3 are performed by the first-in-first-out (FIFO) algorithm. However, in case of the step S314, all hit bits of the large data block of the prefetched data are set as "0".

According to the prefetching mode, the prefetching is performed to data of next address of a large data block which has high access ratio. Thereby, the large block of the prefetched data also has high access ratio, so that overall access time is reduced.

As descried above inputted to the address generator AG. Thereby, the address generator AG does not transmit the next address to the address bus 201, so that the prefetching is not performed. Meanwhile, after the search operation, if the next address is not present in the content addressable memory 227, the content addressable memory 227 inputs a signal of "0" state to the AND gate 205, so that an output signal from an inverter 209 and the AND gate 232 go to be "1" state. In other words, a fetch enable signal of PFSE of "1" state is inputted to the address generator AG. Thereby, the address generator AG transmits the next address to the address bus 201, so that the prefetching is performed. This prefetching is performed within a step for updating the fully associative buffer 22 (the step S313 in FIG. 3). More particularly, during operation of the step S313 for updating the fully associative buffer 22, the data to be prefetched are copied into a large data block in the fully, according to a cache control method of the present invention, and a small block of data accessed among a large block of data, which is to be expelled from a fully associative spatial buffer, is copied to a direct-mapped cache. Using hit bit information enables a cache system to selectively determine those small blocks showing strong temporal locality. The cache control method exploits hit bit information about utilization of the small blocks, which is obtained during a time interval proportional to the number of entries in a spatial buffer. Accordingly, the time duration that data reside in the direct-mapped cache is increased by increased temporal locality while maintaining spatial locality, thereby reducing miss ratios and power consumption of a cache system.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for controlling a cache system having a direct-mapped cache configured with a small block size and a fully associative spatial buffer configured with a large block size, having a plurality of small blocks, the method comprising the steps of:
   (a) copying data of an accessed address and data of addresses adjacent to the large block in the fully associative buffer according to a first-in-first-out (FIFO) process if access to the direct-mapped cache is a miss and access to the fully associative spatial buffer is a miss; and
   (b) moving accessed small block(s) to the direct-mapped cache if there is one or more small blocks accessed among the large block of data which is to be expelled from the fully associative spatial buffer in the step (a).

2. A method for controlling a cache system having a direct-mapped cache configured with a small block size and a fully associative spatial buffer configured with a large block size, having a plurality of small blocks, the method comprising the steps of:
   (a) checking whether an empty large block exists in the fully associative buffer if access to the direct-mapped cache is a miss and access to the fully associative buffer is a miss; and
   (b) copying data of an address accessed in the step (a) and data of adjacent addresses in the large block to the fully associative buffer according to a FIFO process, if the empty large block exists in the step (a).

3. The method for controlling a cache system according to claim 2, if no empty block exists in the step (a), the method further comprising,
   checking whether a small data block, which has been written directly to the fully associative spatial buffer, exists among its corresponding large data block to be expelled according to a first-in-first-out (FIFO) process.

4. The method for controlling a cache system according to claim 3, the method further comprising,
   moving the corresponding small data block into the direct-mapped cache if the small data block which has been written directly to the fully associative spatial buffer exists belonging to its large data block to be expelled.

5. The method for controlling a cache system according to claim 4, the method further comprising,
   checking whether the small block of data that has been accessed exists among the large block of data to be expelled according to a FIFO process.

6. The method for controlling a cache system according to claim 5, the method further comprising,
   checking whether the small block of data to be expelled has been written directly to the direct-mapped cache if the small block of data accessed exists.

7. The method for controlling a cache system according to claim 6, the method further comprising,
   moving the small block of data to be expelled into the main memory if the small block of data to be expelled has been written directly to the direct-mapped cache or to the fully associative buffer.

8. The method for controlling a cache system according to claim 7, the method further comprising,
   moving the small block of data to the direct-mapped cache, wherein the small block of data is confirmed to have been accessed in the step of checking whether the small block of data has been accessed among the large block of data that is to be expelled according to a FIFO process.

9. The method for controlling a cache system according to claim 8, the method further comprising,
   copying data of an address accessed in the step (a) and data of adjacent addresses in the large block to the fully associative buffer according to a FIFO process.

10. A program storage device readable by machine, tangibly embodying a program of instructions executable by the machine to perform method steps for controlling a cache system having a direct-mapped cache configured with a small block size and a fully associative spatial buffer configured with a large block having a plurality of small blocks:
   (a) checking whether an empty large block exists in the fully associative buffer if accesses to the direct-mapped cache and the fully associative buffer are misses;
   (b) if the empty large block exists in the step (a), performing a following step (c7);
   (c) if no empty block exists in the step (a), performing following steps (c1)–(c7);
   (c1) checking whether a small data block, which has been written directly to the fully associative spatial buffer, exists among its corresponding large data block to be expelled according to a first-in-first-out (FIFO) process;
   (c2) if the small data block which has been written directly to the fully associative spatial buffer exists belonging to its large data block to be expelled, copying the corresponding small data block into the direct-mapped cache;
   (c3) checking whether the small block of data that has been accessed exists among the large block of data to be expelled according to a FIFO process;
   (c4) if the small block of data accessed exists, checking whether the small block of data to be expelled has been written directly to the direct-mapped cache;
   (c5) if the small block of data to be expelled has been written directly to the direct-mapped cache or to the fully associative buffer, moving the small block of data to be expelled into the main memory;

(c6) copying the small block of data confirmed to have been accessed in the step (c3) to the direct-mapped cache; and (c7) copying data of an address accessed in the step (a) and data of adjacent addresses in the large block to the fully associative buffer according to a FIFO process.

11. A cache system comprising:

a direct-mapped cache and a fully associative spatial buffer, the direct-mapped cache being configured with a small block size, the fully associative spatial buffer being configured with a large block size having a plurality of small blocks of small block size, wherein data of an accessed address and data of adjacent addresses are copied to the large block in the fully associative buffer according to a first-in-first-out (FIFO) process if accesses to the direct-mapped cache and the fully associative spatial buffer are misses; and one or more small blocks accessed among the large block of data which is to be expelled from the fully associative spatial buffer are moved into the direct-mapped cache.

12. The method for controlling a cache system according to claim 1, further comprising the steps of:

if at least two small data blocks of a large data block in the fully associative buffer are accessed, prefetching data of next address of the large data block, and copying the prefetched data to the large block in the fully associative buffer within the step (a), according to the first-in-first-out (FIFO) process.

* * * * *